United States Patent
Yasuda et al.

(10) Patent No.: US 8,122,705 B2
(45) Date of Patent: Feb. 28, 2012

(54) EXHAUST CLEANING APPARATUS AND METHOD THEREOF

(75) Inventors: Hajime Yasuda, Tokyo (JP); Kouichi Mori, Ayase (JP); Daisuke Yoshioka, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 925 days.

(21) Appl. No.: 11/924,756

(22) Filed: Oct. 26, 2007

(65) Prior Publication Data

US 2008/0098722 A1    May 1, 2008

(30) Foreign Application Priority Data

Oct. 27, 2006  (JP) .................. 2006-292251
Sep. 21, 2007  (JP) .................. 2007-245383

(51) Int. Cl.
*F01N 3/00* (2006.01)

(52) U.S. Cl. ................. 60/285; 60/274; 60/287; 60/299

(58) Field of Classification Search .................... 60/284, 60/285, 287, 288, 295, 300, 302; 123/198 F, 123/481

See application file for complete search history.

(56) References Cited

U.S. PATENT DOCUMENTS

| | | | |
|---|---|---|---|
| 4,107,921 A * | 8/1978 | Iizuka | 60/288 |
| 4,256,074 A * | 3/1981 | Sugasawa et al. | 60/276 |
| 4,287,716 A * | 9/1981 | Schuster et al. | 60/276 |
| 5,582,004 A * | 12/1996 | Rutschmann | 60/288 |
| 5,647,207 A * | 7/1997 | Grotjahn et al. | 60/300 |
| 7,051,516 B2 * | 5/2006 | Pott et al. | 60/285 |
| 7,647,766 B2 * | 1/2010 | Surnilla et al. | 60/285 |

FOREIGN PATENT DOCUMENTS

JP    09-088687    3/1997

* cited by examiner

*Primary Examiner* — Thomas Denion
*Assistant Examiner* — Diem Tran
(74) *Attorney, Agent, or Firm* — Global IP Counselors, LLP

(57) ABSTRACT

An internal combustion engine of a vehicle is provided with an exhaust cleaning apparatus and control method. In the exhaust cleaning apparatus and method, exhaust from a combustion chamber is conducted to a main catalytic converter disposed in a main exhaust channel. A fuel cutting operation is performed upon determining a deceleration state in the vehicle and establishment of a condition for stopping fuel supply to the engine. Then, a main-channel blocking device closes the main exhaust channel so that the exhaust flows through a bypass catalytic converter disposed in a bypass exhaust channel upstream from the main catalytic converter and then merges again with the main exhaust channel upstream from the main catalytic converter after the fuel cutting operation and upon determining one of either an elapsed of a prescribed period of time, or an air-fuel ratio of the exhaust reaching a stable state.

20 Claims, 6 Drawing Sheets

EXHAUST CLEANING APPARATUS AND METHOD THEREOF

CROSS-REFERENCE TO RELATED APPLICATIONS

This application claims priority to Japanese Patent Application Nos. 2006-292251, filed on Oct. 27, 2006 and 2007-245383, filed on Sep. 21, 2007. The entire disclosures of Japanese Patent Application Nos. 2006-292251 and 2007-245383 are hereby incorporated herein by reference.

BACKGROUND OF THE INVENTION

1. Field of the Invention

The present invention relates to a catalyst regenerating apparatus for an exhaust cleaning apparatus of an internal combustion engine. More specifically, the present invention relates to controlling an internal combustion engine having a main catalytic converter and a bypass catalytic converter for removal of sulfur poisoning in the catalyst of the bypass catalytic converter.

2. Background Information

Most vehicles with an internal combustion engine are provided with an exhaust cleaning apparatus. One example of a conventional exhaust cleaning apparatus for an internal combustion engine is disclosed in Japanese Laid-Open Patent Publication No. 9-88687. In this publication, the exhaust cleaning apparatus includes a pair of catalytic converters provides in the exhaust system. The exhaust system has an exhaust pipe with a main catalytic converter and a bypass exhaust channel with a bypass catalytic converter. The main and bypass exhaust channels are parallel. A bypass controlling-valve is provided at the branch point of the exhaust pipe and the bypass exhaust channel such that the exhaust is controlled so as to flow into either the exhaust pipe or the bypass exhaust channel.

In this publication, the exhaust flows into the bypass exhaust channel while the internal combustion engine warms up, and the exhaust is cleaned by the bypass catalytic converter provided in the bypass exhaust channel. After warm-up, the exhaust flows into the exhaust pipe, and the exhaust is cleaned by the main catalytic converter provided in the exhaust pipe.

In view of the above, it will be apparent to those skilled in the art from this disclosure that there exists a need for an improved catalyst regenerating apparatus. This invention addresses this need in the art as well as other needs, which will become apparent to those skilled in the art from this disclosure.

SUMMARY OF THE INVENTION

High temperature exhaust gas flows from the internal combustion engine through a main exhaust channel. Typically, a main catalytic converter is provided in the main exhaust channel directly downstream from the internal combustion engine. The catalyst in the main catalytic converter that is provided directly downstream from the internal combustion engine is usually maintained at a high temperature such that the catalyst in the catalytic converter is not readily sulfur poisoned. On the other hand, when the exhaust cleaning apparatus contains a bypass exhaust channel with a bypass catalytic converter for bypassing the main exhaust channel, the exhaust is made to flow into the bypass catalytic converter provided directly downstream from the internal combustion engine during start-up. After start-up, a switch is made so that the exhaust flows to the main exhaust channel during normal operation. However, with this configuration, part of the exhaust will flow to the bypass even during normal operation. Exhaust will therefore flow through the bypass even though the amount of heat provided to the bypass catalytic converter by the exhaust flowing to the bypass has decreased. In other words, problems arise in that, when a bypass catalytic converter is provided in the bypass, the temperature will not rise to a temperature at which sulfur poisoning does not readily occur. Also, since part of the exhaust will be continuously flowing through the catalytic converter, the amount of sulfur poisoning will continuously increase. Thus, the sulfur may eventually be impossible to remove, and performance of the bypass catalytic converter may be reduced due to the sulfur poisoning.

Therefore, one object of the present invention to provide an internal combustion engine catalyst regenerating method and/or an exhaust cleaning apparatus for regenerating a catalyst that is used in cleaning exhaust during warm-up and that is poisoned with sulfur over time.

The above mentioned object can basically be attained by providing a catalyst regenerating control method for an exhaust cleaning apparatus of a vehicle that comprises: conducting exhaust from a combustion chamber of an internal combustion engine to a main catalytic converter disposed in a main exhaust channel; determining occurrence of a deceleration state in the vehicle; determining establishment of at least one condition for stopping fuel supply to the internal combustion engine during the deceleration state of the vehicle; performing a fuel cutting operation upon the determining of the establishment of the condition for stopping fuel supply to the internal combustion engine; and closing a main-channel blocking device so that the exhaust discharged from the combustion chamber flows into a bypass exhaust channel disposed upstream from the main catalytic converter, through a bypass catalytic converter disposed in the bypass exhaust channel and then merges again with the main exhaust channel upstream from the main catalytic converter after performing the fuel cutting operation and upon determining one of an elapsed of a prescribed period of time, or an air-fuel ratio of the exhaust reaching a stable state.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
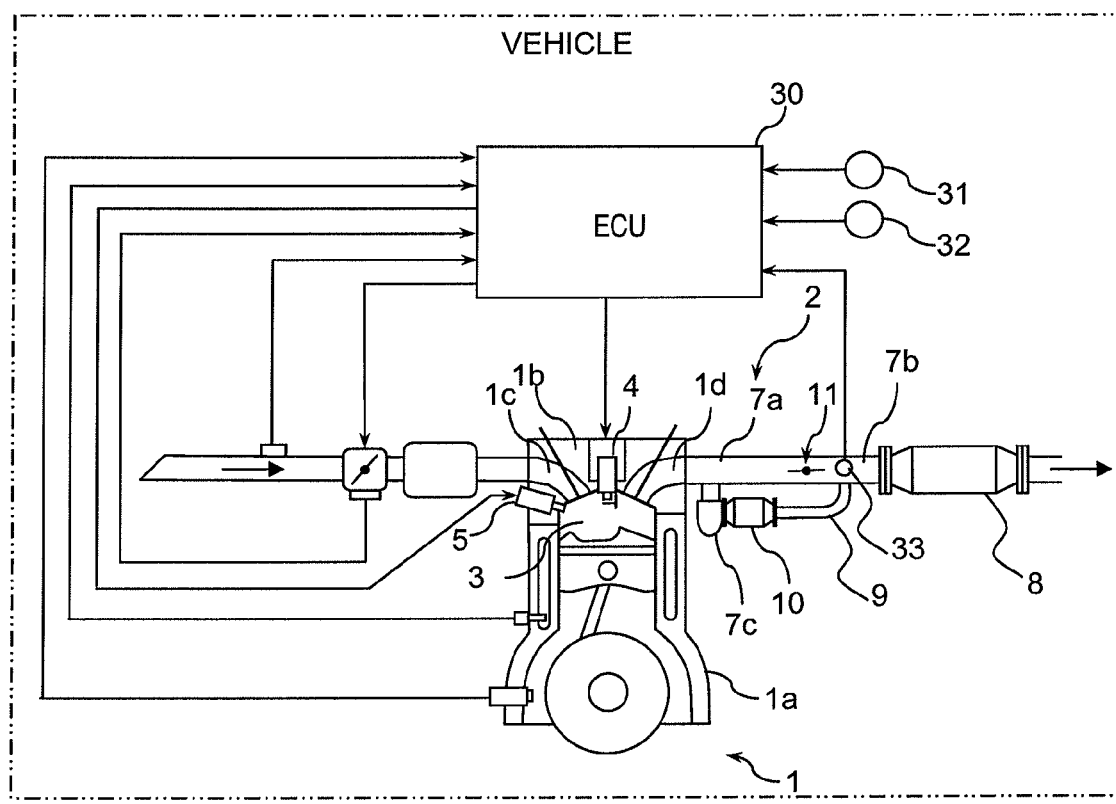
FIG. 1 is a schematic structural diagram of an example of an internal combustion engine with an exhaust cleaning apparatus in accordance with illustrated embodiments.
Figure 2:
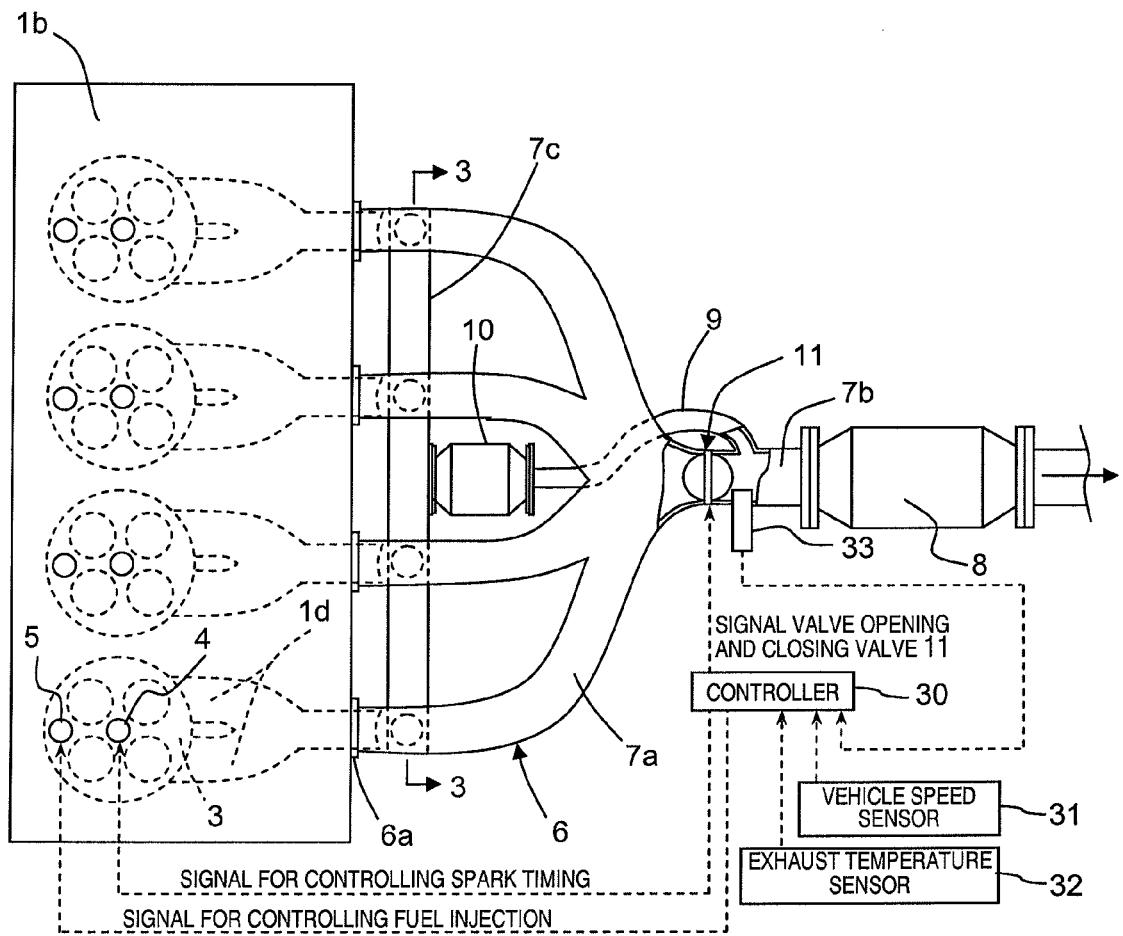
FIG. 2 is a schematic structural diagram of selected portions of the internal combustion engine and the exhaust cleaning apparatus illustrated in FIG. 1.

Referring initially to FIG. 2, an internal combustion engine 1 is schematically illustrated with an exhaust cleaning apparatus 2 in accordance with a first embodiment. The internal combustion engine 1 can be a conventional internal combustion engine, and thus, the internal combustion engine 1 will not be described and/or illustrated in detail. The internal combustion engine 1 includes among other things, an engine block 1a, a cylinder head 1b, a plurality of exhaust ports 1c and a plurality of exhaust ports 1d. The engine block 1a and the cylinder head 1b define a plurality of combustion chambers 3. The cylinder head 1b is provided with a plurality of spark plugs 4 and a plurality of fuel injection valves 5, with one of the spark plugs 4 and one of the fuel injection valves 5 being disposed in each of the combustion chambers 3.

As seen in FIG. 2, an exhaust pipe 6 connects to the exhaust ports 1d of the cylinder head 1 via flanges 6a. The exhaust pipe 6 includes an exhaust manifold 7a, a main exhaust channel or pipe 7b and a communicating channel 7c. The exhaust manifold 7a is connected to the exhaust ports 1d. The main exhaust pipe 7b is assembled with the exhaust manifold 7a. The communicating channel 7c is arranged for fluidly connecting the branches of the exhaust manifold 7a. A main catalytic converter 8 is disposed in the main exhaust pipe 7b. The main catalytic converter 8 includes, e.g., a three-way catalyst or an HC trap catalyst for removing HC in the exhaust.

Figure 3:
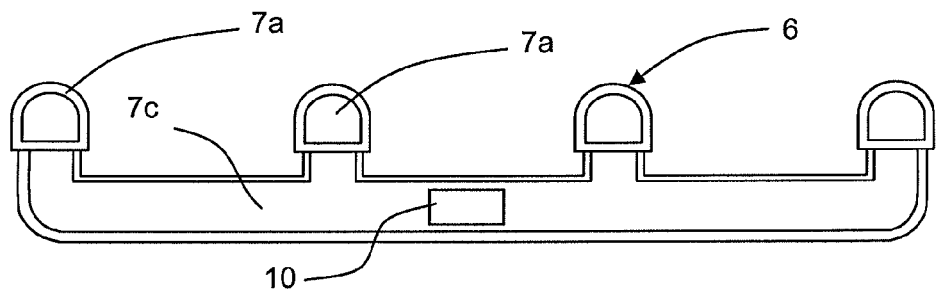
FIG. 3 is a cross-sectional view of the exhaust cleaning apparatus as seen along section line 3-3 of FIG. 2.

The communicating channel 7c has a smaller cross-sectional area than the exhaust manifold 7a. The communicating channel 7c is provided below the exhaust manifold 7a, as shown in FIG. 3. A bypass exhaust channel or pipe 9 connects via a bypass catalytic converter 10 to an aperture part provided at substantially the center of the communicating channel. The bypass catalytic converter 10 has a smaller capacity than the main catalytic converter 8. In the illustrated embodiment, for example, the bypass catalytic converter 10 is a three-way catalyst that cleans exhaust during warm-up of the internal combustion engine. The communicating channel 7c is not limited to a layout involving connecting the exhaust manifold 7a and the bypass exhaust pipe 9. The communicating channel 7c can also, e.g., be formed to fluidly connect the exhaust ports 1d of the cylinder head 1 and connect to the bypass exhaust pipe 9.

The bypass exhaust pipe 9 connects to the main exhaust pipe 7b upstream from the main catalytic converter 8. In particular, the bypass exhaust pipe 9 includes a first end connected to the main exhaust pipe 7b by the communicating channel 7c at a first point that is upstream from the main catalytic converter 8, and a second end connected to the main exhaust pipe 7b at a second point that is upstream from the main catalytic converter 8.

A flow-channel switching valve 11 is disposed in the main exhaust pipe 7b upstream of the merging point of the main exhaust pipe 7b and the bypass exhaust pipe 9. The flow-channel switching valve 11 constitutes a main-channel blocking device. The opening and closing of the flow-channel switching valve 11 is controlled by an integrated controller 30 so that exhaust either primarily flows through the exhaust manifold 7a to the main catalytic converter 8 or flows through the communicating channel 7c to the main catalytic converter 8. Specifically, when the flow-channel switching valve 11 closes the main exhaust pipe 7b, the exhaust flows into the communicating channel 7c and through the bypass catalytic converter 10 where the exhaust is cleaned by the bypass catalytic converter 10. The cleaned exhaust then flows into the main catalytic converter 8. When the main exhaust pipe 7b is open, exhaust flows into the exhaust manifold 7a and is cleaned by the main catalytic converter 8.

The positioning of the flow-channel switching valve 11 is not limited to the above mentioned layout in which the flow-channel switching valve is positioned in the main exhaust pipe 7b. Flow-channel switching valves can also be positioned at, e.g., the merging points of the exhaust manifold 7a and the communicating channel 7c, as long as the positioning is such that the exhaust can be switched between the exhaust manifold 7a and the bypass exhaust pipe 9.

The integrated controller 30 is provided as an engine control unit (ECU) to control the opening and closing of the flow-channel switching valve 11 and the operational state of the internal combustion engine. The integrated controller 30 preferably includes a microcomputer with an engine control program that controls the operational state of the internal combustion engine as discussed below. The integrated controller 30 also includes other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the integrated controller 30 can be any combination of hardware and software that will carry out the functions of the present invention.

The integrated controller 30 receives signals from a plurality of sensors, including but not limited to, a speed sensor 31, an exhaust temperature sensor 32 and an air-fuel ratio sensor 33. In particular, the speed sensor 31 detects a vehicle speed of the vehicle, and then outputs a vehicle speed signal indicative of the vehicle speed to the integrated controller 30. The exhaust temperature sensor 32 detects an exhaust temperature of the main exhaust pipe 7b at the merge point of the main exhaust pipe 7b with the bypass exhaust pipe 9, and then outputs an exhaust temperature signal indicative of the exhaust temperature to the integrated controller 30. The air-fuel ratio sensor 33 detects an air-fuel ratio of the exhaust in the main exhaust pipe 7b at the merge point of the main exhaust pipe 7b with the bypass exhaust pipe 9, and then outputs an air-fuel ratio signal indicative of the air-fuel ratio to the integrated controller 30. The air-fuel ratio sensor 33 is provided in the main exhaust pipe 7b downstream of the flow-channel switching valve 11 and upstream from the main catalytic converter 8 for detecting the air-fuel ratio of the exhaust.

According to the open or closed state of the flow-channel switching valve 11 and in concert with the opening and closing thereof, the controller 30 controls the ignition timing of a spark plug 4 provided to the internal combustion engine or the amount of fuel injected by a fuel injection valve 5 and the fuel injection timing.

In the exhaust cleaning apparatus configured in this fashion, the catalyst in the bypass catalytic converter 10 disposed as described above in the bypass exhaust pipe 9 becomes activated and cleans exhaust only while the internal combustion engine 1 is warming up, but exhaust is not actively conducted to the bypass catalytic converter 10 thereafter. The catalyst in the main catalytic converter 8 (provided directly downstream from the internal combustion engine 1) is therefore usually maintained at a high temperature relative to the catalyst in the bypass catalytic converter 10 provided below the vehicle floor or in other locations when high-temperature exhaust gas flows from the internal combustion engine. Therefore, the catalyst in the main catalytic converter 8 is not readily poisoned by sulfur.

On the other hand, in the case of the exhaust cleaning apparatus 2 of the present embodiment, which includes the bypass catalytic converter 10 that bypasses the main exhaust channel (exhaust pipe 6), exhaust is made to flow directly into the bypass catalytic converter 10, which is provided directly downstream from the internal combustion engine 1 during start-up. After start-up, the exhaust is switched to flow to the main exhaust channel (exhaust pipe 6) during normal operation. However, with this configuration, part of the exhaust flows to the bypass even during normal operation. Exhaust will therefore flow through the bypass exhaust channel 9 even though the amount of heat provided to the catalytic converter 10 by the exhaust flowing to the bypass exhaust channel 9 has decreased. In other words, experiments have clarified that when a catalyst is provided to the bypass, part of the exhaust gas will always be flowing in a state in which the temperature does not reach a point to prevent poisoning from readily occur. Thus, in this situation, the amount of sulfur poisoning will increase in the catalyst of the bypass catalytic converter.

The bypass catalytic converter 10 can be regenerated in a state in which sulfur is removed by controlling the operational state of the internal combustion engine 1. Sulfur is removed when, e.g., the temperature of the exhaust is high and the operational state of the internal combustion engine 1 is such that the air-fuel ratio is lean. The present embodiment provides a method for regenerating a catalyst provided to an internal combustion engine, in which sulfur poisoning is eliminated from the catalyst of the bypass catalytic converter 10 that cleans exhaust during warm-up.

Figure 4:
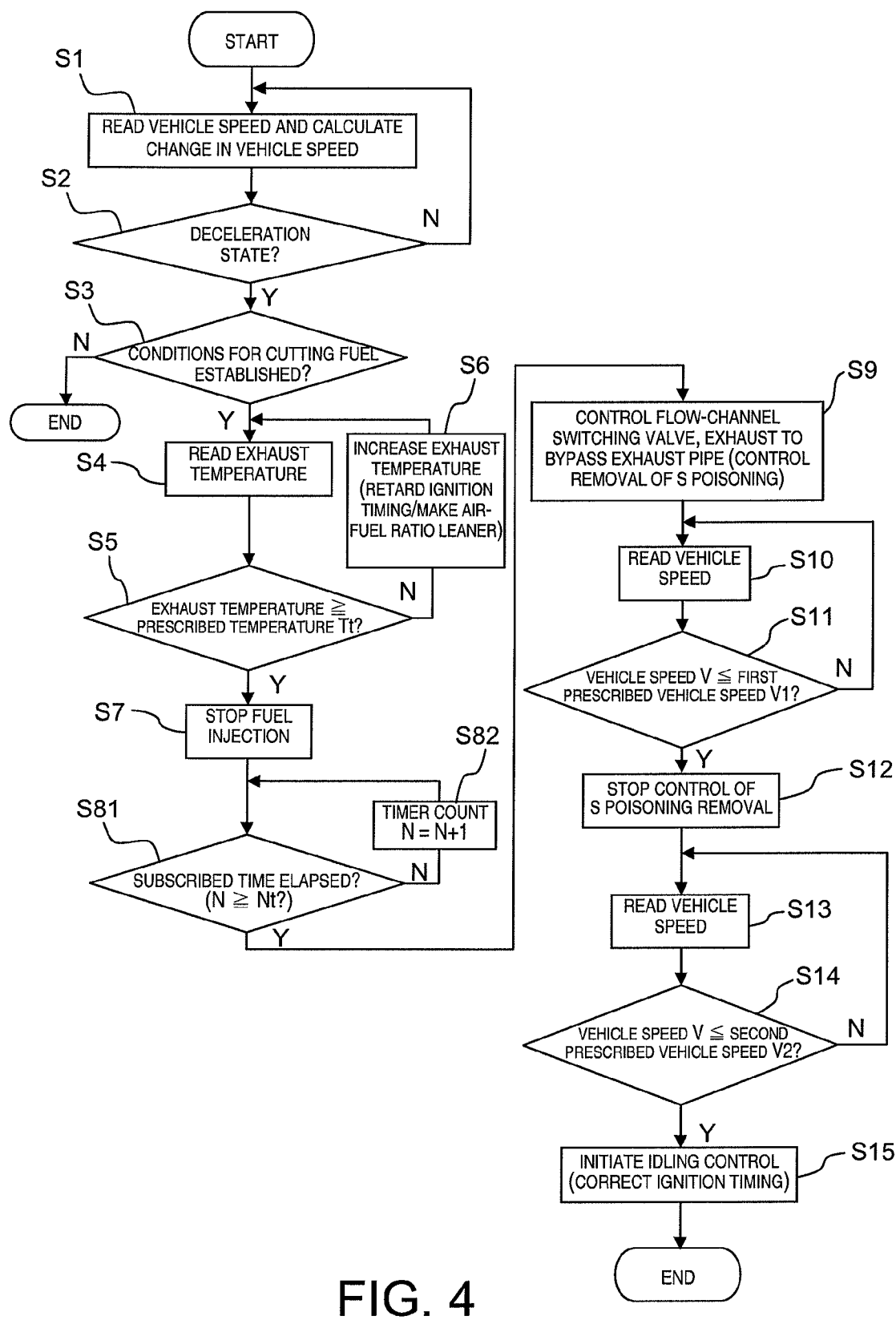
FIG. 4 is a flow chart showing a bypass catalyst regeneration control process executed by the controller illustrated in FIGS. 1 and 2 in accordance with a first embodiment for describing bypass catalyst regeneration control.

FIG. 4 is a flow chart for describing the regeneration control of the bypass catalytic converter 10. The regeneration control is implemented by the controller 30 based on the operational state or conditions of the internal combustion engine 1.

First, in step S1, the vehicle speed is read from the speed sensor 31, and the change in vehicle speed is calculated. Then, in step S2, a determination is made as to whether or not the change in vehicle speed is a deceleration state. The process proceeds to step S3 in the case of deceleration and otherwise returns to step S1. This "deceleration state" includes, e.g., situations in which the driver turns releases the accelerator or in which the vehicle is coasting.

In step S3, a determination is made as to whether the fuel supply to the internal combustion engine 1 can be stopped during deceleration (i.e., whether the conditions for cutting fuel have been established). Specifically, for example, a determination is made as to whether the rate of engine rotation is less than or equal to a prescribed value (e.g., 2000 rpm) when the accelerator is released, and/or whether an operation such as air conditioning or another auxiliary load has been demanded. The engine 1 may stall due to a fuel cut in such instances, and therefore the fuel is not cut. If the conditions for cutting fuel are not established in step S3, the process ends.

When the conditions for cutting fuel have been determined to have been established in step S3, the exhaust temperature is read from the output of the temperature sensor 32 in the following step S4, and then the process proceeds to step S5.

In step S5, a determination is made as to whether or not the detected exhaust temperature is greater than or equal to a prescribed temperature Tt, e.g., greater than or equal to a prescribed temperature of 700° C. to 800° C. The exhaust temperature will be relatively high when the internal combustion engine has been in a state of high-load operation before deceleration. Exhaust will already be flowing to the bypass catalytic converter 10 in such instances if the exhaust temperature is greater than or equal to the prescribed temperature Tt, whereby a determination is made that the bypass catalytic converter 10 is at a temperature at which sulfur can be removed and that regeneration is possible, and the process proceeds to the following step S7.

When the temperature is less than the prescribed temperature Tt in step S5, a control is executed for raising the exhaust temperature of the internal combustion engine. Specifically, the ignition timing of the internal combustion engine is corrected so as to be less frequent than the ignition timing when the determination of deceleration was made. The exhaust temperature rises due to the retardation of the ignition timing. Therefore, the flow subsequently returns to step S4. The exhaust temperature is read again. In step S5, if the exhaust temperature is determined to be greater than or equal to the prescribed temperature Tt, the process proceeds to step S7.

By retarding the ignition timing or by correcting the target air-fuel ratio of the internal combustion engine 1 to be leaner in addition to retarding the ignition timing, after-burning can be induced within the exhaust pipe downstream from the internal combustion engine 1, whereby the exhaust temperature can be raised. Thus, the process proceeds to step S7, when the exhaust temperature is greater than or equal to the prescribed temperature Tt.

In step S7, fuel injection is stopped. The control then executes a prescribed waiting period after fuel injection is stopped so that the temperature of the catalyst of the bypass catalytic converter 10 does not rise excessively. Thus, the process proceeds to steps S81 and S82 to execute the prescribed waiting period. This prescribed waiting period depends on the amount of engine exhaust, but a time of approximately one second was determined as a rough experimental value.

In step S81 of the present embodiment, a determination is made as to whether or not a timer counter N for measuring the time since the stopping of fuel supply is greater than or equal to a prescribed count number Nt. If the timer counter is greater than or equal to the prescribed count number Nt, then a determination is made that the prescribed waiting period has elapsed from the stopping of fuel supply and that fluctuations in the air-fuel ratio due to the stopping of fuel supply have converged. If the timer counter has not reached the prescribed count, the count is raised in step S82, and the flow returns to step S81.

Once the prescribed waiting period has elapsed from the stopping of fuel supply, the process proceeds to step S9, where the flow-channel switching valve 11 is controlled. Switching the flow-channel switching valve 11 in order to remove sulfur poisoning in the present embodiment is implemented. In particular, in step S9, the flow-channel switching valve 11 is closed so that exhaust is made to flow into the bypass exhaust pipe 9. Exhaust having a temperature for preserving a catalyst temperature appropriate for removing sulfur poisoning is therefore introduced into the bypass catalytic converter 10, and sulfur bonded to the bypass catalytic converter 10 can be removed.

Part of the unburned fuel may remain in the exhaust gas discharged to the exhaust ports 1d from the combustion chambers 3 of the internal combustion engine 1 directly after fuel injection stops, and will reach the catalyst. Meanwhile, part of the exhaust gas will flow to the catalyst of the bypass catalytic converter 10 in the internal combustion engine 1 of the present embodiment even during normal engine operation when the flow-channel switching valve is open and exhaust gas is made to flow to the main exhaust channel before fuel supply is stopped, and part of the unburned fuel and the like will adhere to the catalyst of the bypass catalytic converter 10. The temperature of the catalyst of the bypass catalytic converter 10, which is provided directly downstream from the internal combustion engine and has a smaller heat capacity relative to the main catalyst in order to promote warm-up, may rise beyond the temperature appropriate for controlling the removal of poisoning in such situations when the flow-channel switching valve 11 is switched directly after fuel injection stops.

Regeneration control of the bypass catalytic converter 10 is performed until the vehicle speed decelerates to a first prescribed vehicle speed V1 (e.g., 80 km/h). In step S10, the vehicle speed V is read using the speed sensor 31, and in step S11, a determination is made as to whether or not the read vehicle speed V is less than or equal to the first prescribed vehicle speed V1. If the vehicle speed is less than or equal to the first prescribed vehicle speed V1, then the process proceeds to step S12. If the vehicle speed exceeds the first prescribed vehicle speed V1, then the process returns to step S10 in order to continue the regeneration of the bypass catalytic converter 10.

In step S12, the flow-channel switching valve 11 is controlled, and the exhaust is made to flow into the exhaust manifold 7a. The regeneration of the bypass catalytic converter 10 is thereby ended, and sulfur-removal regeneration of the main catalytic converter 8, to which the exhaust flows, is thereby initiated.

In step S13, the vehicle speed V is read once again, and in step S14, a determination is made as to whether or not the detected vehicle speed V is less than or equal to a second prescribed vehicle speed V2 (e.g., 4 km/h). If the vehicle speed is less than or equal to the second prescribed vehicle speed V2, then the process proceeds to step S15, and the ignition timing and fuel injection amount are controlled so as to enter the idling control state of the internal combustion engine 1.

The control of the present embodiment was described assuming that the vehicle is in a state of constant deceleration, but bypass catalyst regeneration control is interrupted when, e.g., a switch is made to a state of acceleration during control. Determinations can also be made as to whether or not to implement the regeneration control of the bypass catalytic converter 10 according to the time elapsed or distance traveled from the last time that regeneration control was implemented or according to the vehicle speed or amount of deceleration at the start of control. Shocks are particularly prone to occur during flow-channel switching in catalyst regeneration starting at low vehicle speeds (e.g., 40 km/h), at which the flow-channel switching valve 11 should not be switched in step S9. A speed between approximately 80 km/h and 40 km/h is therefore desirable as the first prescribed vehicle speed. When flow-channel switching for controlling poisoning removal from the bypass catalyst cannot be performed, high-temperature, lean-burning exhaust is introduced to the main catalytic converter 8, and the sulfur of the main catalytic converter 8 can be removed.

Figure 5:
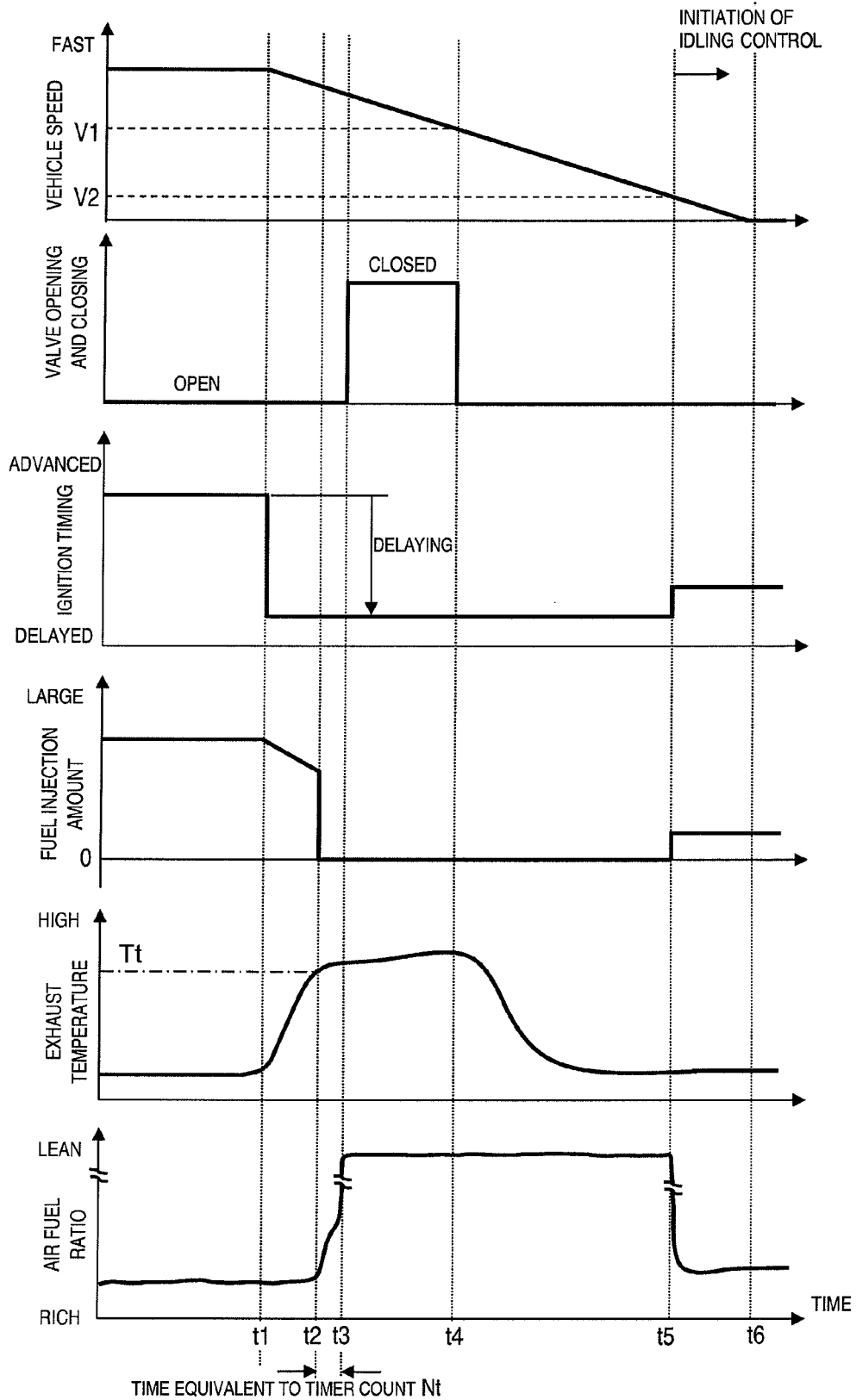
FIG. 5 is a first timing chart for describing bypass catalyst regeneration control of the controller illustrated in FIGS. 1 and 2.

FIG. 5 is a first timing chart that shows a time series of the changes in the factors accompanying the regeneration control of the bypass catalytic converter 10.

When the vehicle enters a deceleration state at time t1, the ignition timing is retarded, and the exhaust temperature is raised. When the exhaust temperature reaches the prescribed temperature Tt (time t2), fuel injection ceases, and the prescribed waiting period is implemented until an amount of time equal to the prescribed count number Nt has elapsed. The exhaust temperature is maintained at or above the prescribed temperature Tt during this time. When the prescribed waiting period elapses at time t3, the flow-channel switching valve 11 is switched, and the exhaust is made to flow into the bypass exhaust pipe 9. The regeneration of the bypass catalytic converter 10 is thereby initiated.

The regeneration of the bypass catalytic converter 10 is implemented until the vehicle speed V reaches the first prescribed vehicle speed V1 (time t4). Once the vehicle speed V reaches the first prescribed vehicle speed V1, the flow-channel switching valve 11 is controlled, the exhaust is made to flow through the exhaust manifold 7a, and regeneration control of the bypass catalytic converter 10 is ended.

When the vehicle speed V reaches the second prescribed vehicle speed V2 (time t5) thereafter, the internal combustion engine is put into an idling state and engine stalling is inhibited. The vehicle stops at time t6.

The flow-channel switching valve in the present embodiment is therefore controlled when the vehicle decelerates, and lean-burning exhaust is made to flow into the bypass exhaust pipe 9. The sulfur in the catalyst of the bypass catalytic converter 10 disposed in the bypass exhaust pipe 9 can therefore be removed, and the catalyst can be regenerated. The ignition timing is retarded and fuel injection is stopped when the sulfur of the bypass catalytic converter 10 is removed, whereby the exhaust temperature is raised, and the sulfur of the bypass catalytic converter 10 can be reliably removed.

Control for opening and closing the flow-channel switching valve 11 is implemented after a prescribed period of time has elapsed after fuel injection has stopped, whereby the effects of fluctuations of the air-fuel ratio after fuel injection has stopped can be minimized. The air fuel ratio detected by the air-fuel ratio sensor 33 is shown in the timing chart at the bottom of FIG. 5. An air-fuel ratio feedback control causes the air-fuel ratio to be substantially stoichiometric until the time t1. However, due to the decrease of the fuel injection amount during the period from the time t1 to the time t2 and due to the fuel injection being stopped (cut) at the time t2, the air-fuel ratio enters a trend of shifting from a stoichiometric state toward a lean state.

Although the supply of fuel to the engine 1 is stopped at the time t2, the output of the air-fuel ratio sensor 33 does not indicate that the air-fuel ratio is lean for a prescribed period after the time t2, i.e., until the fuel mixture has become quite lean or until the air-fuel ratio has reached a lean output limit of the air-fuel ratio sensor 33 (e.g., an air-fuel ratio of 30). This indicates that exhaust gas resulting from combustion is still flowing out of the engine 1 and that, even though the fuel supply has been cut, the exhaust gas does not immediately cease to contain any fuel. If the flow-channel switching valve 11 is switched under these conditions, then gas containing unburned fuel will flow into the bypass catalytic converter 10 and react with the catalyst, possibly causing the catalyst temperature to rise excessively.

Therefore, in this embodiment, the flow-channel switching valve 11 is closed when a prescribed amount of time has elapsed after the fuel supply is stopped at the time t2, thereby preventing the temperature of the catalyst from rising excessively. In this embodiment, the prescribed amount of time after the time t2 (an amount of time equivalent to the timer count Nt) is set to an amount of time in which the air-fuel ratio of the exhaust gas becomes stable. More specifically, as shown in the timing chart in FIG. 5, the prescribed amount of time elapsing from when stopping the fuel at the time t2 until closing the flow-channel switching valve 11 at the time t3 is set such that the air-fuel ratio of the exhaust gas flowing from the engine 1 to the main exhaust pipe 7b can be assumed to be substantially air only. During the prescribed amount of time, the air-fuel ratio of the exhaust gas stabilizes within a prescribed range (time t3).

It is also acceptable to set the prescribed amount of time based on the properties of the sensor to a time that exceeds an amount of time required for the sensor to output its lean output limit value or, for example, to a time at which the air-fuel ratio exceeds a prescribed air-fuel ratio threshold value (e.g., 30) at which it can be assumed that substantially air only is flowing.

When the vehicle speed reaches the first prescribed vehicle speed V1, the flow-channel switching valve 11 is controlled, and the exhaust is made to flow into the exhaust manifold 7a, whereby a switch can be made to removing the sulfur of the main catalytic converter 8. The flow-channel switching valve 11 was switched and exhaust was made to flow to the catalyst of the bypass catalytic converter 10 when prescribed conditions for cutting fuel were established during deceleration in the present embodiment, but the flow-channel switching valve 11 can also be closed so that exhaust flows into the bypass exhaust channel 9 only when prescribed conditions for calculating an amount of poisoning correlated to the amount of poisoning of the bypass catalytic converter are detected and when the prescribed conditions for the amount of poisoning are established.

The amount of poisoning of the catalyst in the bypass catalytic converter 10 increases in accordance with the time elapsed from the opening of the flow-channel switching valve 11 or simply with the cumulative operational time of the internal combustion engine 1. These time periods are therefore parameters that are correlated to the amount of poisoning of the bypass catalytic converter 10. Once the exhaust reaches a high temperature, the amount of poisoning of the catalyst in the bypass catalytic converter 10 will decrease to the extent that the regeneration time is lengthened, and therefore the elapsed time from the closing of the flow-channel switching valve 11 is also a parameter that is correlated to the amount of poisoning of the bypass catalytic converter 10.

In a configuration in which the flow-channel switching valve 11 is not constantly closed during deceleration of the vehicle, and in which the flow-channel switching valve 11 is only closed when the amount of poisoning exceeds the prescribed conditions and deceleration is detected, the number of times that the flow-channel switching valve 11 is switched can be reduced in comparison to cases in which the valve is switched upon each deceleration. The period of durability of the flow-channel switching valve 11 can therefore be set longer, and the period of durability of the valve as an exhaust cleaning apparatus can be improved, which is advantageous from the perspective of cost.

The present embodiment has a configuration in which the bypass exhaust pipe 9 is connected to the main exhaust pipe 7b between the flow-channel switching valve 11 and the main catalytic converter 8, whereby the exhaust flowing into the bypass exhaust pipe 9 is introduced into the main catalytic converter 8. As a result, the main catalytic converter 8 can be heated by the exhaust even while the internal combustion engine 1 is warming up.

Figure 6:
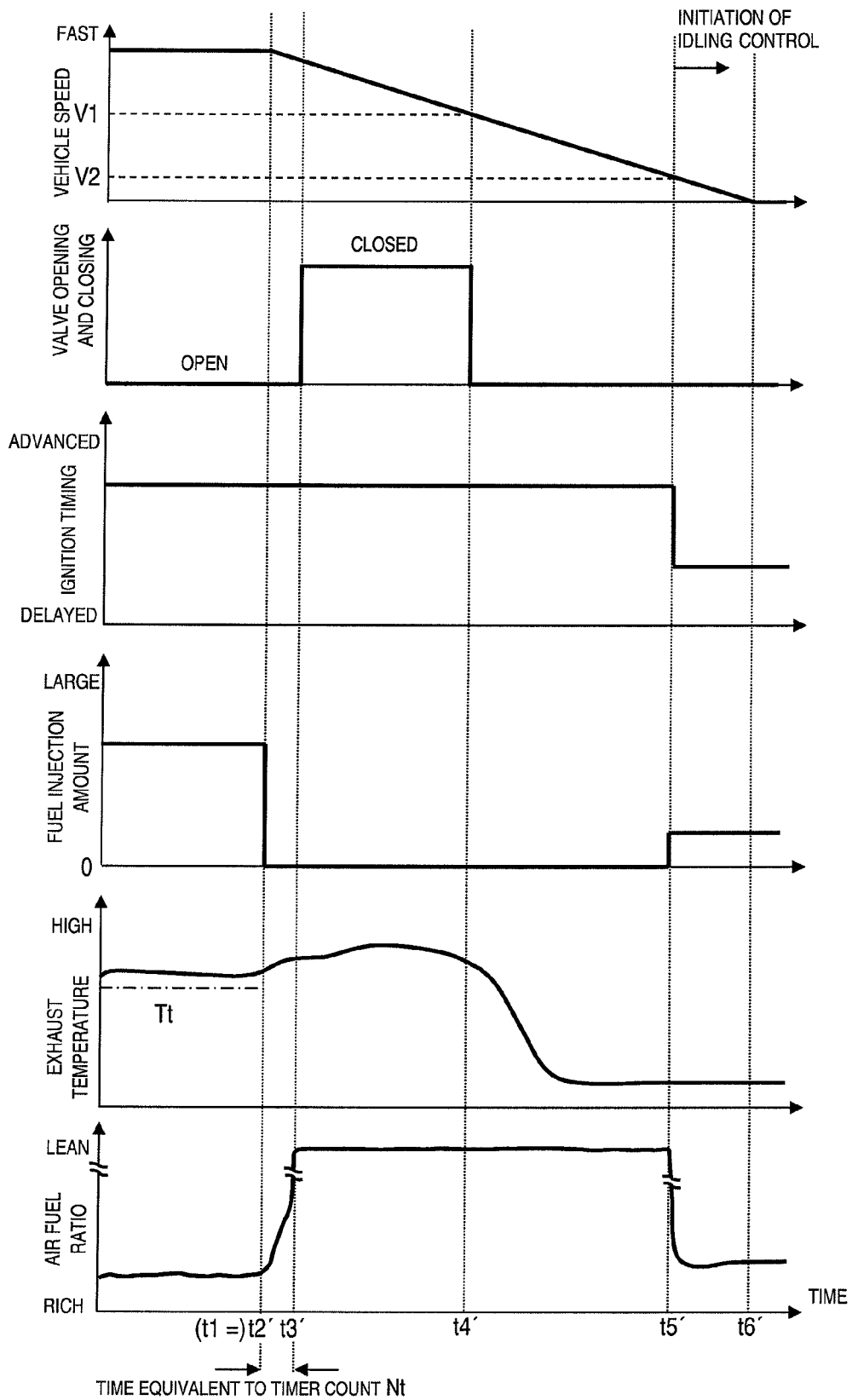
FIG. 6 is a second timing chart for describing bypass catalyst regeneration control of the controller illustrated in FIGS. 1 and 2.

FIG. 6 is a second timing chart that shows a time series of the changes in the factors accompanying the regeneration control of the bypass catalytic converter 10.

The portion of the second timing chart that is different from the first timing chart of FIG. 5 is that the exhaust temperature is higher than Tt when the determination of deceleration is made. This case is particularly relevant when the internal combustion engine 1 has been continuing under high-load operation to a certain degree before the determination of deceleration. Since the exhaust temperature is higher than Tt when the determination of deceleration is made, fuel injection is stopped without any delay in the ignition timing of the spark plugs 4 or other actions being performed for increasing the exhaust temperature. In this instance as well, the flow-channel switching valve 11 is switched after a pause is made for a prescribed period of time to elapse after fuel injection has stopped, and therefore the effects of fluctuations of the air-fuel ratio after fuel injection has stopped can be minimized. The temperature of the catalyst of the bypass catalytic converter 10 can therefore be prevented from rising beyond the temperature appropriate for controlling the removal of poisoning, and poisoning removal can be performed.

Figure 7:
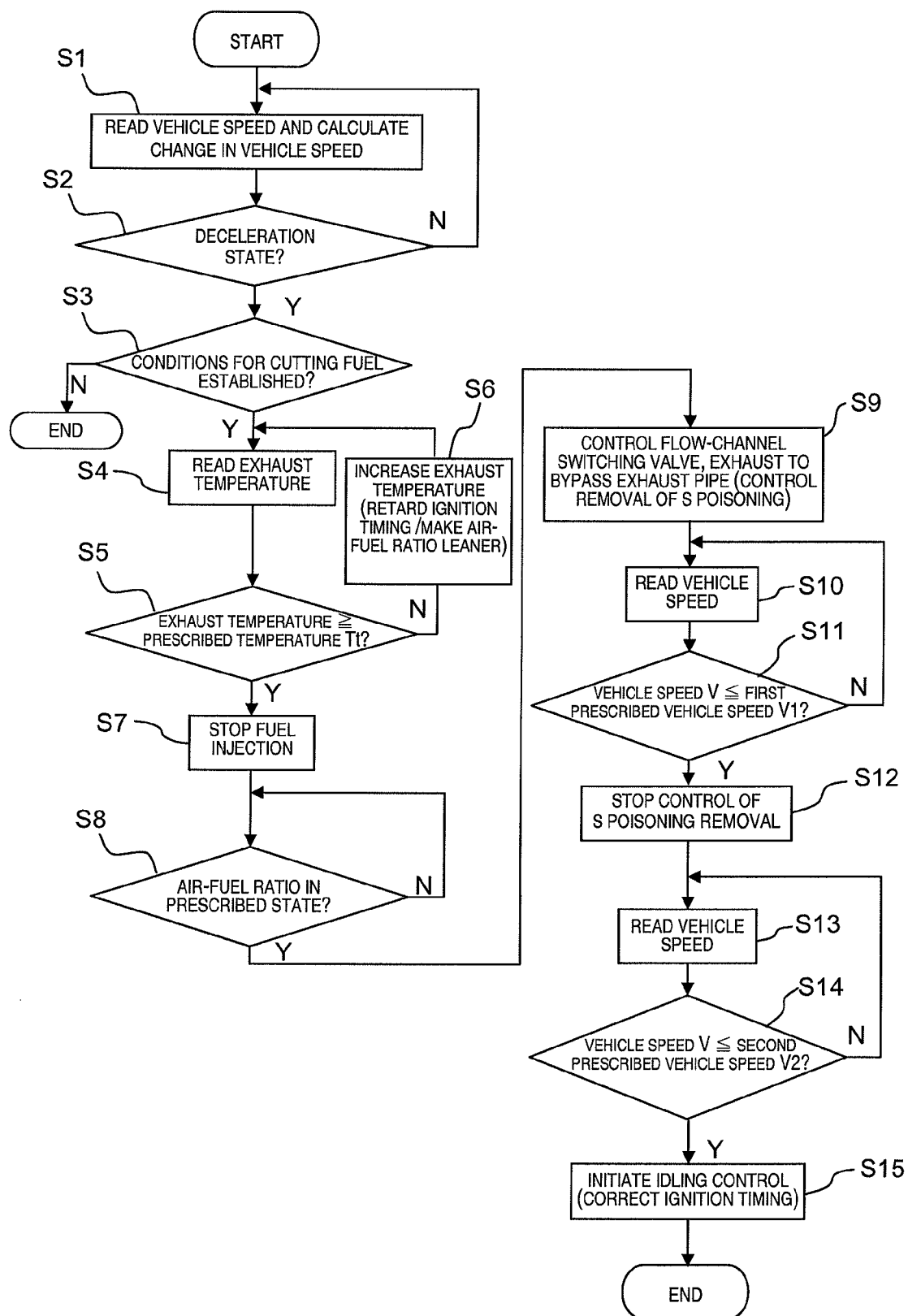
FIG. 7 is a flow chart showing a bypass catalyst regeneration control process executed by the controller of the exhaust cleaning apparatus illustrated in FIGS. 1 and 2 in accordance with a second embodiment for describing bypass catalyst regeneration control.

Referring now to FIG. 7, a modified control of the controller 30 will be discussed. In the first embodiment, a timer counter is used to determine the continuation of the prescribed period of time in step S81, but a determination can also be made as to whether or not the air-fuel ratio of the exhaust has reached a stable state instead of determining the elapsed time. Specifically, in the flow chart of FIG. 7, steps S81 and S82 of the flow chart of FIG. 4 have bee replaced with step S8. Instead of steps S81 and S82, the air-fuel ratio of the exhaust can be read using the air-fuel ratio sensor 33 upstream from the main catalytic converter 8, and a determination can be made as to whether or not the air-fuel ratio has reached a prescribed stable state (e.g., whether or not the air-fuel ratio demonstrates adherence to a prescribed leanness, or whether or not the air-fuel ratio has stabilized and the amount of change per unit of time is within a prescribed range or is approximately zero).

Thus, in the process of the second embodiment as illustrated in FIG. 7, the steps S1 to S7 and S9 to S15 of the second embodiment are identical to the steps S1 to S7 and S9 to S15 in first embodiment. In step S8, the air-fuel ratio of the exhaust is read by the air-fuel ratio sensor 33 upstream from the main catalytic converter 8, and a determination is made as to whether or not the air-fuel ratio has reached a prescribed stable state.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A catalyst regenerating control method for an exhaust cleaning apparatus of a vehicle comprising:
   conducting exhaust from a combustion chamber of an internal combustion engine to a main catalytic converter disposed in a main exhaust channel;
   determining occurrence of a deceleration state in the vehicle;
   determining establishment of at least one condition for stopping fuel supply to the internal combustion engine during the deceleration state of the vehicle;
   performing a fuel cutting operation upon the determining of the establishment of the condition for stopping fuel supply to the internal combustion engine; and
   switching a main-channel blocking device from an open state to a closed state so that the exhaust discharged from the combustion chamber flows into a bypass exhaust channel disposed upstream from the main catalytic converter, through a bypass catalytic converter disposed in the bypass exhaust channel and then merges again with the main exhaust channel upstream from the main catalytic converter in response to determining one of
      an elapse of a prescribed period of time after performing the fuel cutting operation, or
      an air-fuel ratio of the exhaust reaching a stable state after performing the fuel cutting operation.

2. The catalyst regenerating control method according to claim 1, further comprising
   retarding an ignition timing of the internal combustion engine to raise an exhaust temperature before the fuel cutting operation during deceleration of the vehicle and before the switching of the main-channel blocking device.

3. The catalyst regenerating control method according to claim 1, further comprising
   correcting an air-fuel ratio of the internal combustion engine to leaner value than the air-fuel ratio occurring before the determining of the deceleration state, with the correcting of the air-fuel ratio occurring before the fuel cutting operation during the deceleration state and before the switching of the main-channel blocking device.

4. The catalyst regenerating control method according to claim 1, wherein
   the stopping of the fuel supply includes stopping fuel injection in the internal combustion engine upon the determining of the deceleration state and upon determining exhaust temperature is greater than or equal to a prescribed temperature.

5. The catalyst regenerating control method according to claim 1, further comprising
   opening the main-channel blocking device so that the exhaust discharged from the combustion chamber flows into the main exhaust channel upon determining a vehicle speed decreasing to a prescribed vehicle speed.

6. The catalyst regenerating control method according to claim 1, wherein
   the switching of the main-channel blocking device occurs for the prescribed period of time.

7. The catalyst regenerating control method according to claim 1, wherein
   the switching of the main-channel blocking device occurs when the air-fuel ratio of the exhaust reaches the stable state.

8. The catalyst regenerating control method according to claim 1, wherein
   the conducting exhaust includes conducting exhaust from each combustion chamber of the internal combustion engine to the main catalytic converter disposed in the main exhaust channel.

9. A catalyst regenerating control method for an exhaust cleaning apparatus of a vehicle comprising:
   conducting exhaust from a combustion chamber of an internal combustion engine to a main catalytic converter disposed in a main exhaust channel;
   determining occurrence of a deceleration state in the vehicle;
   determining establishment of at least one condition for stopping fuel supply to the internal combustion engine during the deceleration state of the vehicle;
   performing a fuel cutting operation upon the determining of the establishment of the condition for stopping fuel supply to the internal combustion engine; and
   closing a main-channel blocking device so that the exhaust discharged from the combustion chamber flows into a bypass exhaust channel disposed upstream from the main catalytic converter, through a bypass catalytic converter disposed in the bypass exhaust channel and then merges again with the main exhaust channel upstream from the main catalytic converter after performing the fuel cutting operation and upon determining one of
      an elapse of a prescribed period of time, or
      an air-fuel ratio of the exhaust reaching a stable state,
   the closing of the main-channel blocking device occurring at the elapse of the prescribed period of time, which corresponds to a time period that ends when fuel discharged from the internal combustion engine is no longer present.

10. An exhaust cleaning apparatus comprising:
    a main exhaust channel fluidly connected to at least one exhaust port of at least one combustion chamber of an internal combustion engine for a vehicle;
    a main catalytic converter disposed in the main exhaust channel;
    a bypass exhaust channel including a first end connected to the main exhaust channel at a first point that is upstream from the main catalytic converter and a second end connected to the main exhaust channel at a second point that is upstream from the main catalytic converter;
    a bypass catalytic converter disposed in the bypass exhaust channel between the first and second ends;
    a main-channel blocking device disposed in the main exhaust channel to selectively open and close the main exhaust channel so that the exhaust discharged from the combustion chamber flows into the bypass exhaust channel when the main-channel blocking device is closed; and
    a controller that stop fuel supply to the internal combustion engine upon determining a deceleration state existing in the vehicle and at least one prescribed condition being met for performing a fuel cutting operation,
    the controller switches the main-channel blocking device from an open state to a closed state so that the exhaust discharged from the combustion chamber flows into the bypass exhaust channel disposed upstream from the main catalytic converter, through the bypass catalytic converter disposed in the bypass exhaust channel and then merges again with the main exhaust channel upstream from the main catalytic converter in response to determining one of
- an elapse of a prescribed period of time after performing the fuel cutting operation, or
- an air-fuel ratio of the exhaust reaching a stable state after performing the fuel cutting operation.

11. The exhaust cleaning apparatus according to claim 10, wherein
the controller is further configured to retard an ignition timing of the internal combustion engine to raise an exhaust temperature before the fuel cutting operation during deceleration of the vehicle and before the switching of the main-channel blocking device.

12. The exhaust cleaning apparatus according to claim 10, wherein
the controller is further configured to correct an air-fuel ratio of the internal combustion engine to leaner value than the air-fuel ratio occurring before the determining of the deceleration state, with the correcting of the air-fuel ratio occurring before the fuel cutting operation during the deceleration state and before the switching of the main-channel blocking device.

13. The exhaust cleaning apparatus according to claim 10, wherein
the main exhaust channel is fluidly connected each exhaust port of each combustion chamber of the internal combustion engine for the vehicle.

14. An exhaust cleaning apparatus comprising:
a main exhaust channel fluidly connected to at least one exhaust port of at least one combustion chamber of an internal combustion engine for a vehicle;
a main catalytic converter disposed in the main exhaust channel;
a bypass exhaust channel including a first end connected to the main exhaust channel at a first point that is upstream from the main catalytic converter and a second end connected to the main exhaust channel at a second point that is upstream from the main catalytic converter;
a bypass catalytic converter disposed in the bypass exhaust channel between the first and second ends;
a main-channel blocking device disposed in the main exhaust channel to selectively open and close the main exhaust channel so that the exhaust discharged from the combustion chamber flows into the bypass exhaust channel when the main-channel blocking device is closed; and
a controller that stop fuel supply to the internal combustion engine upon determining a deceleration state existing in the vehicle and at least one prescribed condition being met for performing a fuel cutting operation,
the controller closes the main-channel blocking device so that the exhaust discharged from the combustion chamber flows into the bypass exhaust channel disposed upstream from the main catalytic converter, through the bypass catalytic converter disposed in the bypass exhaust channel and then merges again with the main exhaust channel upstream from the main catalytic converter after performing the fuel cutting operation and upon determining one of
- an elapse of a prescribed period of time, or
- an air-fuel ratio of the exhaust reaching a stable state, the controller being further configured to close the main-channel blocking device at the elapse of the prescribed period of time, which corresponds to a time period that ends when fuel discharged from the internal combustion engine is no longer present.

15. The exhaust cleaning apparatus according to claim 10, wherein the controller is further configured to stop the fuel supply by stopping fuel injection in the internal combustion engine upon the determining of the deceleration state and upon determining exhaust temperature is greater than or equal to a prescribed temperature.

16. The exhaust cleaning apparatus according to claim 10, wherein
the controller is further configured to open the main-channel blocking device so that the exhaust discharged from the combustion chamber flows into the main exhaust channel upon determining a vehicle speed decreasing to a prescribed vehicle speed.

17. The exhaust cleaning apparatus according to claim 10, wherein
the controller is further configured to close the main-channel blocking device for the prescribed period of time.

18. The exhaust cleaning apparatus according to claim 10, wherein
the controller is further configured to close the main-channel blocking device when the air-fuel ratio of the exhaust reaches the stable state.

19. An exhaust cleaning apparatus comprising:
main exhaust channel means for fluidly conveying exhaust from at least one exhaust port of at least one combustion chamber of an internal combustion engine for a vehicle;
main exhaust cleaning means for cleaning exhaust flowing through the in the main exhaust channel means;
bypass exhaust channel means for fluidly conveying exhaust from a first point of main exhaust channel means is upstream from the main exhaust cleaning means to a second point of the main that is upstream from the main catalytic converter;
bypass exhaust cleaning means for cleaning exhaust flowing through the bypass exhaust channel means;
main-channel blocking means for selectively opening and closing the main exhaust channel means so that the exhaust discharged from the combustion chamber flows into the bypass exhaust channel means when the main-channel blocking means is closed; and
controlling means for stop fuel supply to the internal combustion engine upon determining a deceleration state existing in the vehicle and at least one prescribed condition being met for performing a fuel cutting operation, and for switching the main-channel blocking means from an open state to a closed state so that the exhaust discharged from the combustion chamber flows into the bypass exhaust channel means disposed upstream from the main catalytic converter, through the bypass exhaust cleaning means disposed in the bypass exhaust channel means and then merges again with the main exhaust channel means upstream from the main exhaust cleaning means in response to determining one of
- an elapse of a prescribed period of time after performing the fuel cutting operation, or
- an air-fuel ratio of the exhaust reaching a stable state after performing the fuel cutting operation.

20. The exhaust cleaning apparatus according to claim 19, wherein
the main exhaust channel means is for fluidly conveying exhaust from each exhaust port of each combustion chamber of the internal combustion engine for the vehicle.

* * * * *